March 13, 1962 U. S. MITCHELL 3,025,010

MAGNETIC TAPE CARTRIDGE

Filed Jan. 27, 1961

INVENTOR.
ULYSS S. MITCHELL

BY

Lippincott, Ralls & Hendricson
ATTORNEYS

United States Patent Office 3,025,010
Patented Mar. 13, 1962

3,025,010
MAGNETIC TAPE CARTRIDGE

Ulyss S. Mitchell, 1150 Yew St., San Mateo, Calif.

Filed Jan. 27, 1961, Ser. No. 85,310
4 Claims. (Cl. 242—55.13)

The present invention relates to an improved and simplified cartridge for magnetic tapes wherein the difficulties of mobius loop cartridges are overcome, and yet the advantages thereof are retained.

The present invention is particularly directed to the provision of a magnetic tape reel and cartridge of utmost simplicity, particularly as regards the design and cost of manufacture. It is common in the field of magnetic tape recording and reproduction to provide the tape in cartridges, or the like, with little or no cost attached to the cartridge or reel structure. Insofar as the manufacture is concerned, magnetic tape reels or cartridges are considered almost as throw-away items, i.e., quite often cartridges are not individually sold, but are included in the sale of the tape itself. For this reason it is of great importance that the cost of such cartridges be minimized in order to achieve a truly practical unit. In this respect there have been advanced so-called mobius loop cartridges, wherein magnetic tape is wound about a single reel in an endless loop. Such cartridges are utilized by withdrawing the tape from the center of the reel, passing same over guide means and playback means, and thence back to the exterior of the reel. In this manner it is possible to rotate the reel by driving the tape, and yet to attain a relatively simple cartridge structure. This type of magnetic tape cartridge has found wide acceptance in the commercial market, in large part because of the relatively low cost thereof, rather than the quality of reproduction possible therefrom. In particular, it is well recognized that rather substantial difficulties attach to the utilization of such types of cartridges for high fidelity recording and playback. In order to wind and unwind magnetic tape from a single reel of the type briefly noted above, it is necessary for the adjacent turns of tape upon the reel to slide relative to each other. This relative motion of the tape gives rise to static charges upon the tape, which have been blamed for the introduction of substantial noise levels in playback mechanism, as well as binding and uneven feed of the tape. Various steps have been taken to overcome these difficulties, and in particular, there have been advanced improvements in this type of cartridge wherein there are provided graphite blocks, and the like, in an effort to dissipate the static charges noted above.

A complete solution to the static charge problem is afforded by the utilization of a magnetic tape cartridge employing double hubs, wherein the magnetic tape is not required to slide relative to adjacent turns thereof. Double-hub tape reels do not suffer from the difficulties of mobius loop reels, nor do they require the relatively elaborate precautions to overcome static charge problems. One possible difficulty with double-hub reels, however, is the increased complexity thereof over more conventional magnetic tape cartridges, and the consequent increased cost of manufacture and possibly reduced reliability over extended periods of operation. When it is considered that the overall dimensions of a magnetic tape cartridge must be kept within extremely small values, the difficulties of the situation become self-evident. Thus, in order to provide an operable double-hub tape reel or cartridge, it is necessary for each of the hubs alternately to operate as a take-up portion for the tape, and consequently, to be driven from the supply hub. In order to utilize conventional tape recording and playback mechanisms, it is necessary for the tape drive to itself provide all motive power for the cartridge elements. Consequently, it is necessary for the supply reel or hub, which is forcibly rotated by means withdrawing tape therefrom, to transmit motion to the take-up portion of the cartridge. A number of alternative methods of accomplishing this result are known in the art, and each must accommodate a variable drive ratio, inasmuch as the variation of the effective diameter of the reel from which the tape is withdrawn and rewound requires varying hub rotational speeds to accommodate uniform linear tape velocity.

The present invention provides a substantial simplification of double-hub tape reel cartridges adapted for high fidelity magnetic tape recording and playback. Extreme simplicity of cartridge components and structure is herein achieved without sacrificing the advantages of double-hub tape reels. The present invention retains the advantages of compactness found in mobious loop cartridges, the advantage of self-contained packaging, ease of handling and use in multiple cartridge playback mechanisms, while at the same time entirely overcoming the limitations of this type of cartridge in high fidelity recording and playback. Furthermore, the present invention provides a material simplification over previous double-hub reel cartridges. A variable speed drive ratio between the separate hubs of the unitary cartridge mechanism is attained herein with elements and structure which provide the requisite reliability and performance characteristics without the multiplication of components and consequent substantial costs of manufacture. The limited available dimensions of magnetic tape cartridges militates against complexity of same, for it is only by achieving rather extreme tolerances and carrying out rather complicated manufacturing and assembly operations that it is possible to produce complex mechanisms of this size. Furthermore, the present invention provides for a high degree of reliability of operation over extended periods of time, inasmuch as the structural elements hereof are limited in number and in complexity of configuration.

The magnetic tape cartridge of the present invention provides for a variable drive ratio between separate hubs thereof through frictional engagement of drive and driven means between the hubs, and extended experimentation has shown that a drive ratio varying from 2.5:1 to 1:2.5 is possible with the cartridge hereof over extended periods of operation without damage to the cartridge itself. This is herein achieved while yet maintaining a marked simplicity of structure and a minimum of operating elements. It is only necessary, in accordance with the present invention, to provide two sets of drive means containing ratchet connections and extending between the closely associated double hubs of the cartridge to attain the desired results of this invention. There is herein eliminated the necessity of providing switching means between the drive means of the two hubs, and the novel and simplified orientation of elements of this invention allows the utilization of maximum dimensions for the drive means in order to further simplify manufacturing problems and reduce costs thereof.

It is an object of the present invention to provide an improved magnetic tape cartridge from which magnetic tape is adapted to be fed and rewound, and wherein there is provided for extremely uniform tape motion with a minimized structural complexity.

It is another object of the present invention to provide an improved and simplified double-hub reel for a magnetic tape cartridge having a pair of drive shafts disposed in parallel relation to a hub axle for obtaining desired differential drive ratios from either hub to the other with a minimum of structural complexity.

Various other objects and advantages of the present invention will become apparent from the following description of the single preferred embodiment of this invention; however, no limitation is intended by the terms of the following description, and instead, reference is made to the accompanying claims for a precise delineation of the true scope of the invention.

The invention is illustrated as to a single preferred embodiment thereof in the accompanying drawing, wherein.

Figure 1:
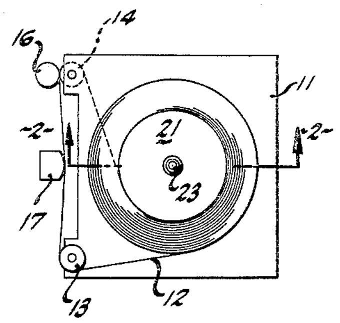
FIG. 1 is a plan view of a magnetic tape cartridge, in accordance with this invention.

As shown in the accompanying drawing, the cartridge hereof includes a central rigid mounting plate 11 adapted to carry the tape hubs and differential drive mechanism. This mounting plate may be employed as the cartridge-mounting means in playback and recording mechanism as, for example, by sliding the plate into slots provided in such mechanism. Magnetic tape 12 is provided in an endless loop, as illustrated in FIG. 1, wound about one of the hubs and extending therefrom in a free loop back to the other hub. Upon the central plate 11, there may be provided a pair of guide means 13 and 14 over which the magnetic tape loop is extended. One of these guide means 14 may also serve as a pinch wheel against which a capstan 16 of the playback mechanism is adapted to press, with the tape 12 therebetween. Rotation of the drive capstan 16 will thus be seen to advance the tape over the pinch wheel 14, which is mounted for free rotation, and consequently, to draw the tape across playback or recording means 17 of the mechanism. To this extent, the double-hub magnetic tape cartridge of the present invention is relatively conventional, although it will be seen to differ rather markedly from the mobius loop-type cartridge, inasmuch as the tape is fed from one side of the central plate 11 past the playback head to the other side of the central plate.

Figure 3:
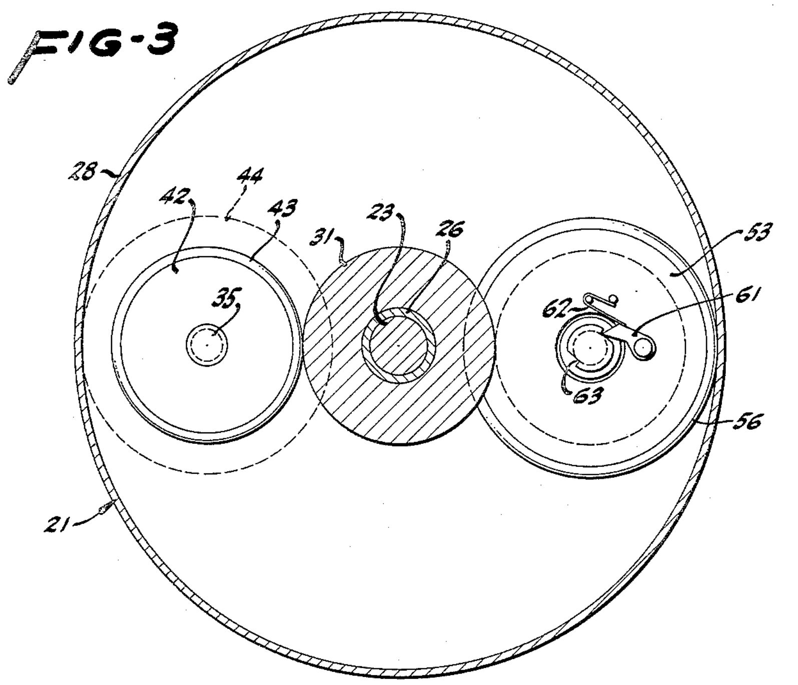
FIG. 3 is a plan view in section, taken in the plane 3—3 of FIG. 2.
Figure 2:
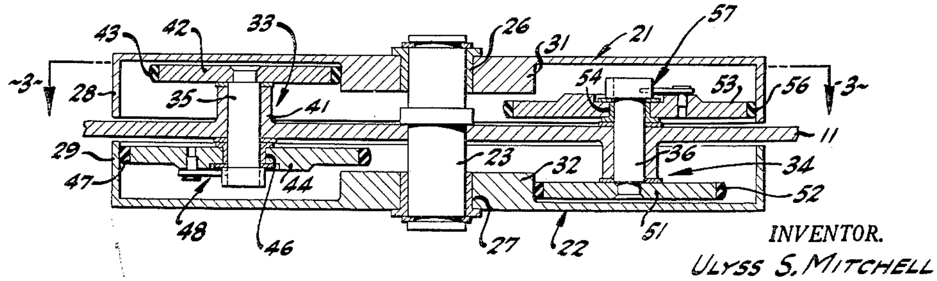
FIG. 2 is an elevational sectional view, taken in the plane 2—2 of FIG. 1.

Considering now the simplified and highly reliable variable drive means herein provided between the double hubs of the cartridge, reference is made to FIGS. 2 and 3 of the drawing. As shown in these figures, a pair of hubs 21 and 22 are mounted upon an axle 23 extending through the central plate 11. The two hubs are formed as shallow, open-ended cylinders, having the open ends thereof facing each other upon opposite sides of the central plate. The axle 23 is rigidly fixed perpendicularly through the central plate, and the hubs are mounted for rotation upon this axle, as by means of bushings 26 and 27, as illustrated. Suitable keeper means are provided for mounting the hubs upon the axle, and in close proximity to the central plate so as to minimize the overall dimensions of the cartridge. These hubs will thus be seen to be readily rotatable in either direction about a single common axis, and peripheral walls 28 and 29 about the hubs 21 and 22 respectively, are adapted to have magnetic tape 12 wound thereabout.

As above noted, the magnetic tape unwound from one of the hubs is to be wound back onto the other hub, with the sole drive means for this motivation of the tape being provided by external driving forces produced through the drive capstan of the playback mechanism pressing the tape against a pinch wheel of the cartridge. The direction of tape drive is reversible in conventional playback mechanisms, and thus it is necessary for either of the hubs to be able to operate as a supply reel, and the other hub to operate as the take-up reel of the cartridge. With the sole motivating force for tape movement being provided by contact with the tape exteriorly of the cartridge itself, it is thus apparent that only the hub acting as a tape supply means will be forcibly rotated by tape movement, and furthermore, that the other hub must be rotated in order to wind the tape back thereon. In accordance with the present invention, and in fact in common with double-hub tape reels, the present invention provides for a variable drive from either hub to the other. This, then, serves to forcibly rotate the hub upon which tape is wound, so as to maintain an even tape tension and to prevent undue slackness or possible extraneous looping of the tape during recording and playback operations.

In accordance herewith, there is provided variable drive means of utmost simplicity and reliability by means of which either hub may be automatically rotated from the other, depending upon the direction of tape movement, while at the same time producing a variable drive ratio to accommodate a constant linear tape velocity. The drive means hereof includes an inner central boss 31 and 32 upon each of the hubs 21 and 22, respectively, with the peripheral surfaces of such bosses serving as friction drive surfaces for forcible rotation of the respective hub. Automatic reversible drive is herein achieved through the provision of a pair of like drive means 33 and 34 disposed on diametrically opposite sides of the central axle 23, and including shafts 35 and 36, respectively, disposed in parallel relation to the axle and mounted through the central plate for rotation therein.

Considering first the drive means 33, illustrated at the left of FIGS. 2 and 3, it will be seen that the shaft 35 is mounted perpendicularly to the central plate 11 through an upstanding boss 41 thereon for rotation therein. Atop this shaft 35 there is provided a drive wheel 42 firmly secured to the shaft and having a peripheral rim 43 formed of rubber, or the like, disposed in frictional engagement with the peripheral edge of the hub boss 31. At the lower end of the shaft 35, beneath the central plate 11, there is provided a driven wheel 44 mounted upon the shaft as by means of a bushing, or the like 46, for free rotation thereabout. Suitable means are provided for locking this lower drive wheel 44 to the shaft, so as to retain the position of same relative to the shaft longitudinally thereof. The drive wheel is also provided with a peripheral rim 47, formed of rubber or the like, disposed in frictional engagement with the inner surface of the peripheral wall 29 about the lower hub 22. This lower drive wheel 44 is disposed adjacent the central plate in extension over the boss 32 upon the lower hub, and will be seen to have a substantially greater diameter than the drive wheel 42 affixed to the top of the drive shaft 35.

Provision is herein made for automatic transmission of rotary drive motion from the lower hub 22 to the upper hub 21 by this above-described drive means 33. Such is accomplished herein by the employment of a simple ratchet means 48, selectively locking the drive wheel and shaft together. This ratchet means, which may take a variety of conventional configurations, serves to positively engage the shaft and drive wheel 44 for rotation of the shaft in a clockwise direction. It will be seen that this direction of rotation of the shaft 35 will result from a counterclockwise rotation of the lower hub 22, as is brought about by the unwinding of magnetic tape therefrom.

The other variable-ratio drive means 34, disposed on the opposite side of the axle 23 from the above-described drive means 33, is substantially the same as the drive means 33 but in inverted position. Thus, this drive means illustrated at the right of FIGS. 2 and 3 will be seen to include a drive wheel 51 secured to the lower end of the shaft 36 beneath the central plate, and having a peripheral rim 52 of rubber, or the like, disposed in frictional engagement with the boss 32 upon the lower hub. Above the central plate and within the upper hub 21 there is disposed a driven frictional wheel 53 mounted for rotation upon the shaft 36 as by means of a bushing, or the like 54. This wheel likewise has a peripheral rim 56 adapted to frictionally engage the inner surface of the wall 28 about the upper hub interiorly thereof, and consequently, to transmit rotary motion to this upper hub as received through the drive wheel 51 and shaft 36. Ratchet means 57 serve to selectively lock the upper wheel 53 to the shaft 36 for counterclockwise rotation of the upper hub.

Although various types of ratchet means may be employed in connection with the selective engagement of the driven wheels with the drive shafts 35 and 36, one simple ratchet means is illustrated in FIG. 3 as including a pawl 61 pivotally mounted upon the wheel 53 and urged against the shaft 36 by a leaf spring 62. Appropriately oriented indentations 63 about the circumference of the shaft serve to provide for engagement on the point of pawl 61 therewith, in order that the shaft and wheel shall be locked together for counterclockwise rotation of the wheel. With the individual indentations upon the shaft formed with a shoulder thereon, as illustrated, together with an almost tangential flat extending from such shoulder, it will be appreciated that the pawl will ride over the intentations for clockwise rotation of the wheel and will alternatively firmly engage the first indentation into which the pawl drops for counterclockwise rotation of the wheel, whereby the shaft and wheel are rigidly locked together for such direction of rotation. The other ratchet means 48 may be formed in like or alternative manner, so as to provide for locking of a pawl with the shaft indentations thereof for counterclockwise rotation of the other drive wheel 44.

From the foregoing description of a single preferred embodiment of the present invention, it will be seen that a minimum of structural elements are included in the variable drive means for the double-hub cartridge hereof. Not only is the structural complexity of the individual elements of the cartridge minimized hereby, but furthermore, the number of elements are quite limited. By the provision of drive shafts located perpendicularly to the hubs or, alternatively stated, parallel to the axle upon which the hubs are mounted for rotation, it will be seen that a materially simplified drive arrangement is provided. Through the utilization of hub bosses and peripheral rims for drive and driven engagement between the hubs, it is possible, in accordance herewith, to materially reduce the number of necessary elements and also the required mechanical motions and complexities thereof.

With regard to the attainment of a variable drive ratio, it will be seen that rotary drive is provided from the peripheral wall of one hub to the central boss of the opposite hub, so that an initial drive ratio of 2.5:1, or so, is provided. The drive ratio of this order is required in order to maintain an even tension upon the tape for linear tape velocity, wherein tape is fed from a maximum diameter about the supply hub to a minimum diameter on the take-up hub. As the amount of tape decreases upon the supply hub and increases upon the take-up hub, it will be seen that the rotary speed of the two hubs must vary in order to achieve a uniform linear tape velocity. This variation in drive ratio is herein attained by the provision of frictional engagement of the drive means with the separate hubs. The rims provided on the drive and driven wheels of the drive means 33 and 34 will be seen to accomplish frictional engagement with metal or plastic surfaces of the hubs, and yet to accommodate slippage in such engagement. Consequently, as the rotary velocity of one hub decreases with respect to the other, the necessary variation in rotary drive ratio is herein automatically achieved by slippage between the drive means and contacted hubs. It will also be further appreciated that the ratchet means 48 and 57 hereof may be employed in connection with the mounting of the drive wheels upon the shafts, rather than the driven wheels upon the shafts. It is only necessary that the cartridge provide for automatic drive of either hub from the other, depending upon which one is then serving as the supply hub from which the tape is being unwound.

In accordance with the objects of the present invention, there is provided herewith a truly simplified double-hub magnetic tape cartridge wherein an automatic variable-ratio drive is provided between the two hubs of the cartridge. The utmost in simplicity is achieved by the structure of the present invention, and consequently, a minimization of manufacturing cost and a maximization of reliability in operation is also achieved. Although it is well known that double-hub magnetic tape reels may be employed to overcome certain of the disadvantages of prior-art devices, it is particularly noted in connection with the present invention that a material improvement is attained by the present invention. While it is certainly true that for certain applications more complicated variable drive means between the two hubs of a double-hub cartridge may be highly advantageous, it yet follows that for a wide variety of commercial applications a major criteria for economic success lies in the provision of a very inexpensive device which yet retains the basic advantages of cartridges of this type. It will thus be apparent that the present invention accomplishes the objects set forth above, and with regard to the inventive concepts and novelty hereof, particular attention is invited to the definition of the present invention in the following claims.

What is claimed is:

1. An improved unitary magnetic tape cartridge comprising a central mounting plate having an axle therethrough, a pair of like circular hubs with peripheral walls thereabout disposed one on each side of said plate and mounted for rotation upon said axle, said hubs being adapted to carry magnetic tape wound about the peripheries thereof and each having a circular central boss facing said plate about said axle, a first drive shaft mounted for rotation in said plate and having a first frictional wheel about one end thereof frictionally engaging a boss upon the first of said hubs for rotating such hub, a second friction wheel ratcheted to the other end of said first shaft and frictionally engaging the peripheral wall of the second of said hubs for driven rotation thereby as tape is withdrawn from said second hub to thereby frictionally drive said first hub, a second shaft mounted for rotation in said plate, a third friction wheel secured to one end of said second shaft for frictional engagement with the boss of said second hub, and a fourth friction wheel ratcheted to the opposite end of said second shaft in an opposite sense to the connection of said second friction wheel and shaft, said fourth friction wheel extending into frictional engagement with the peripheral wall about said first hub for driven rotation thereby to rotate said second hub during unwinding of tape therefrom.

2. An improved unitary tape reel for magnetic tape adapted to wind tape from one portion to another as the tape is driven by external means comprising first and second hubs mounted for rotation upon an axle through a central plate parallel to and separating the hubs, said hubs each having a peripheral wall adapted to have tape wound thereon, first and second shafts mounted for rotation through said plate and disposed in spaced relation within said hubs on opposite sides of said axle, first and second friction drive wheels secured one to each of said shafts and on opposite sides of said plate, said friction wheels each frictionally engaging central circular portions of the hub within which the wheel is disposed for rotating the frictionally engaged hub upon rotation of the shaft carrying the wheel, first and second driven wheels disposed one within each of said hubs and mounted for rotation upon said first and second shafts respectively in frictional engagement with the peripheral wall of the hub within which the wheel is disposed, and first and second ratcheted means locking said first and second driven wheels to their respective shafts for opposite directions of hub rotation whereby rotation of either hub is transmitted to the other hub for driven rotation of the latter in the opposite direction.

3. A unitary tape reel as set forth in claim 2 further defined by each of said wheels having rubber rims for transmitting frictional drive and accommodating slippage in such drive, and said driven wheels each having a diameter in excess of the diameter of said drive wheels for establishing a drive ratio which is variable by wheel slippage.

4. An improved magnetic tape cartridge including a rigid central plate, a pair of shallow, open-ended cylinders disposed on opposite sides of said plate with the open ends thereof facing the plate, an axle fixed in said plate and extending therethrough with said cylinders rotatively mounted on opposite ends of said axle, first and second shafts extending through said plate in rotatable relation thereto, said shafts being disposed on diametrically opposite sides of said axle in parallel relation thereto and both extending into each of said cylinders, a central, internal, circular boss upon each of said cylinders about said axle and having peripheral contact surfaces, a pair of drive wheels disposed one in each of said cylinders upon separate ones of the shafts therein and each frictionally engaging the peripheral drive surface of the cylinder boss, a pair of driven wheels disposed one within each cylinder upon the other shaft therein and frictionally engaging the interior surface of the cylinder wall, and means locking together each shaft and the two wheels thereon for one direction of rotation of the first shaft and for an opposite direction of rotation of the second shaft whereby rotary motion of either cylinder is transmitted to the other cylinder at an initial ratio greater than 1, which is variable with slippage at the frictional engagement of wheels and cylinders.

No references cited.